United States Patent [19]

Ranz

[11] 3,756,553
[45] Sept. 4, 1973

[54] SEGMENTED MOLD FOR BLOWER WHEELS

[75] Inventor: James R. Ranz, Wilmington, Ohio

[73] Assignee: Lau Incorporated, Dayton, Ohio

[22] Filed: July 9, 1971

[21] Appl. No.: 161,101

[52] U.S. Cl................. 249/142, 249/156, 249/184, 164/341
[51] Int. Cl............................................. B28b 7/16
[58] Field of Search................... 164/137, 341, 342; 425/192; 249/156, 184, 142

[56] References Cited
UNITED STATES PATENTS

| 705,146 | 7/1902 | Richter | 249/170 |
|---|---|---|---|
| 1,188,693 | 6/1916 | Stahl et al. | 249/184 |
| 2,652,190 | 9/1953 | Meltzer et al. | 416/187 |
| 2,975,481 | 3/1961 | Kauffman | 425/812 |
| 2,991,004 | 7/1961 | Denbo et al. | 416/188 |
| 3,238,569 | 3/1966 | Scott, Jr. et al. | 425/467 |

*Primary Examiner*—R. Spencer Annear
*Attorney*—Marechal, Biebel, French & Bugg

[57] ABSTRACT

A segmented mold particularly adapted for the high-pressure injection molding of bladed blower wheels of varying blade lengths. The mold includes a base part, one or more intermediate blade-forming sections, and an end part. The length of the blower wheel is varied by selecting one or more intermediate sections. The blade cavities are formed in the intermediate sections, preferably by EDM machining.

6 Claims, 4 Drawing Figures

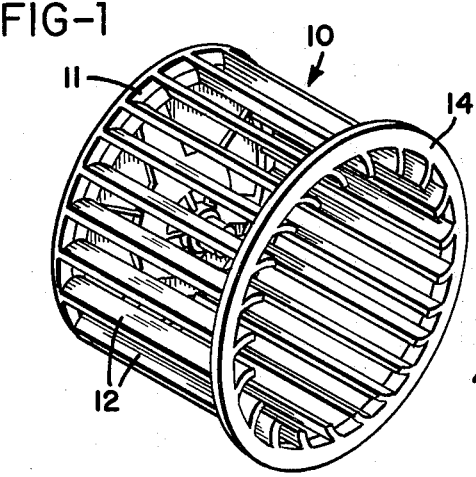
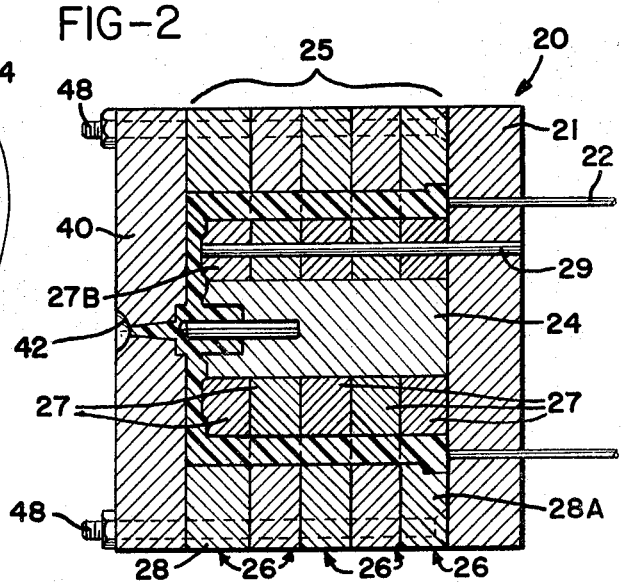
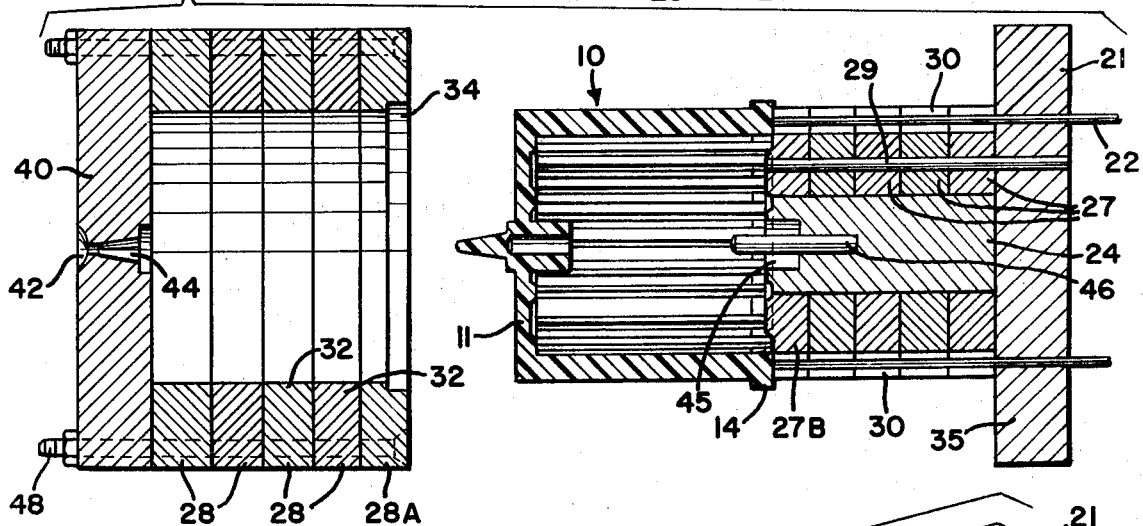
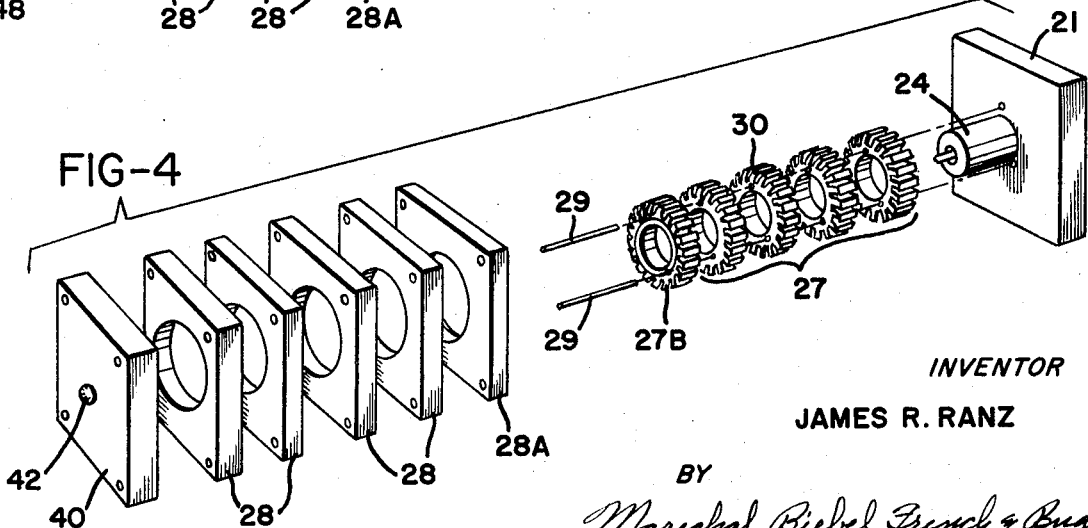
INVENTOR
JAMES R. RANZ

SEGMENTED MOLD FOR BLOWER WHEELS

BACKGROUND OF THE INVENTION

In Meltzer et al, U.S. Pat. No. 2,652,190 of 1953, there is disclosed a two-part mold for the injection molding of a plastic blower wheel. It has been found, however, that the injection molding of bladed blower wheels of the Meltzer type is only economical where a relatively large number of identical blower wheels are to be made.

The Meltzer wheel does have the advantage of being made to a high standard of precision, using low-cost material. Accordingly, there would be many applications for injection molded blower wheels if it were not for the initial relatively high cost of making the die parts. However, many blower wheel production runs for a given axial length of blower are too small to warrant the production of a mold just for that wheel.

A further difficulty resides in the fact that there is a considerable advantage in using air-foil cuvred blades as distinguished from the straight non-curved blades shown in Meltzer. A straight blade is by far the cheapest to make since the blades can be formed by a simple slot or groove in the mold. Curved slots, on the other hand, are generally formed in mold blanks by the EDM process, which is considerably more costly and time consuming than milling a straight slot. Further, the EDM machining of blade slots in blanks of considerable axial length is often a difficult task, and the risk of damaging such a part prior to completion adds a burden to an already-costly part.

Another form of prior plastic blower wheel and a mold therefor are shown in Denbo et al, U.S. Pat. No. 2,991,004 of 1961. The Denbo wheel has blades which are supported, like a cantilever, from the end wall, free of any end reinforcing ring and are tapered and twisted about a longitudinal axis so that the discharge angle of each blade increases as the distance increases from its support end. A mold is diagrammatically snown in which sections 18 may be added or removed, at the free ends of the blades, to accommodate the formation of different lengths of blades. The Denbo mold parts in a plane through the outside face of the end wall, and the blade cavities are totally within one-half of the mold. The removable sections also contain cavities which define entire periphery of the blade.

SUMMARY OF THE INVENTION

The present invention is directed to an improved mold for making a bladed blower wheel with a reinforcing end ring of the general type shown in the Meltzer et al U.S. Pat. No. 2,652,190. A multiple-section mold includes a base part, an end part, and one or more intermediate sections. The first intermediate section adjacent the base part is provided with a recess for forming the blade reinforcing ring, and one or more additional intermediate sections are selectively provided for the purpose of producing finished blower wheels of differing axial lengths.

In the preferred embodiment, the intermediate sections are each formed in two portions, including an inner portion in which the blade slots are formed in the outer periphery such as by EDM machining, and an annular outer portion which forms a closure wall for the blade slots. The inner portions are connected to the base part of the mold while the outer portions are connected to the end part of the mold, so that the end part can be removed together with the outer portions of the intermediate sections to expose the finished wheel and permit ejection therefrom by suitable ejection pins.

It is accordingly an object of this invention to provide a versatile mold for making blower wheels of varying axial lengths, permitting a choice of axial lengths using common mold parts at minimum cost.

A more particular object of the invention is the provision of a mold for making blower wheels of the general type shown in U.S. Pat. No. 2,652,190. invention will be apparent from the following description, the accompanying drawings and the appended claims.

BRIEF DESCRIPTION OF THE DRAWINGS

FIG. 1 is a perspective view of a completed blower wheel made in the mold of the present invention;

FIG. 2 is a transverse section through the improved mold;

FIG. 3 shows the parts of the mold in the open position with the completed blower wheel being removed therefrom; and FIG. 4 is an exploded perspective view of the mold of FIG. 1.

DESCRIPTION OF THE PREFERRED EMBODIMENT

Referring to the drawings, which illustrate a preferred embodiment of the invention, a typical blower wheel 10 is shown in FIG. 1 as having an integral end wall 11, an annular series of peripherally-spaced curved blades 12, and an axially spaced reinforcing ring 14 attached to the remote ends of the blades 12. The blower wheel 10 is of the general type disclosed in U.S. Pat. No. 2,652,190, except that the blades 12 are preferably of a curved air-foil type, of improved efficiency.

As previously described, it is highly desirable to produce cast or injection-molded blower wheels to varying axial length requirements. For example, a typical such blower wheel may be injection molded of polypropylene, glass-filled polystyrene or glass-filled ABS, and may have an eight-inch diameter. In such a typical example, it may be desired to produce this 8-inch diameter wheel in axial lengths from 2 to 5 inches, to comprise a family of four or more wheels with particular characteristics to meet particular application requirements. According to the teachings of the Meltzer et al patent, a different mold would have to be produced for each such wheel, at high cost.

The present invention substantially reduces the cost of forming such a family of blower wheels. The cost reduction is significant particualrly where it is desirable to produce wheels having curved blades. The formation of curved blade-forming slots is by far the most expensive machining operation in the making of molds of this type, and in the present invention at least this machined portion of the blank is divided into a multiplicity of mold parts which may be used in selected axial alignment to produce blower wheels of differing axial lengths.

The typical mold made according to this invention is shown at 20 in FIG. 2. The mold 20 includes a base part 21 which may be suitably mounted or connected to one of the bolster heads or mold shoe supports of the plastic injection machine. For the purposes of the present invention, the base part 21 includes openings through which ejector pins 22 may operate in the conventional manner. Further, the base part 20 may include a central, axially extending mandrel 24, which may be cylindrical in outer configuration.

The invention further includes an intermediate blade-forming section which is illustrated collectively at 25. The section 25 comprises a plurality of selectable intermediate parts 26. Each intermediate part 26, in turn, is made up of an inner portion 27 and an annular outer portion 28.

The inner portions 27 are preferably mounted directly onto the mandrel 24 and are retained by one or more suitable alignment pins 29. The inner portions 27 have blade-forming slots 30 suitably formed in the outer peripheral portion thereof. Preferably, the slots 30 are formed by the EDM process, as disclosed in U.S. Pat. No. 3,322,185. In this process, an annular EDM electrode, not shown, is formed with inwardly extending electrode portions corresponding to the desired configuration of the individual blades 12, and is brought down axially over the blank and the slots 30 are erroded therein corresponding to the shape of the electrode portions and therefore to the shape of the desired blade.

The finished blade slots 30, as shown in FIG. 4, are open at their outer periphery. Accordingly, the annular outer portions 28 are each formed with an inside cylindrical wall surface, as shown at 32 in FIG. 3, for forming a closure wall for the blade slots 30.

The first outer portion 28a differs from the remaining outer portions 28 in that it is formed with an annular recess 34 which defines, with the adjacent radial wall 35 of the base part 21, an annular cavity for forming the end ring 14. Further, the final inner portion 27b may be formed with an axially inward face aligned with the corresponding inner face of the mandrel 24 to define the desired inside surface configuration of the end wall 11 of the blower 10.

The mold is closed by an end part 40 which defines a cavity, as previously noted, with the intermediate section 25 for forming the end 11 of the blower wheel. The end part 40 may be connected to the opposite bolster head of the injection molding machine and may include a conventional nozzle-receiving recess 42 and a sprue passage 44 leading into the mold cavity. Further, the mandrel may be provided with an axial recess 45 (FIG. 3) and may support an axially extending pin 46 for forming the hub and the hub shaft opening of the finished blower wheel.

As shown in the preferred embodiment, the mandrel 24 has an axial length corresponding to the combined assembled lengths of the inner portions 27 of the intermediate section 25. Accordingly, a different mandrel 24 would be provided for each combination of intermediate sections, to produce blower wheels of desired lengths. If desired, however, the mandrel 24 may be made as an integral part of the inner parts 27 or may be itself, formed in axial sections corresponding to those of such intermediate parts. However, since the mandrel 24 preferably includes the hub recess and the hub pin 46, it is preferred to make it as a single piece and provide separate mandrels for each combination of intermediate sections desired, as the machining on such mandrels is minimal when compared to the machining of the intermediate sections 27.

The outer portions 28 of the intermediate section 25 are mounted on the end part 40, such as by the tie bolts 48 so that they are removed as a unit with the end part 40, when the mold is opened as shown in FIG. 3.

The cavity defined by the walls 32 and the individual blade slots 30 defined by the inner portions 27 may be provided with a slight draft angle, if such is desired for assisting in the ejection and removal of the finished part. However, such a draft angle would usually not exceed one-half of one degree and where practical, the draft angle is zero, permitting versatility in interchanging and selecting the parts which make up the intermediate section 25.

The operation of the invention is largely self-evident from the foregoing description. With the exception of the special intermediate parts 28a and 27b, the remaining intermediate sections 25 can be selected and assembled to provide a mold of a desired axial length. When it is desired to shorten this length, for example, one or more of such sections can be removed and a suitable mandrel 24 refitted. Further, while the intermediate sections 26 have been shown as having the same axial length, for the convenience of illustration, it is understood that these sections may be made to varying lengths. For example, one section may be made to provide ¼ inch increments, and another may be made to provide ½ inch increments, providing further versatility in selecting blower wheel lengths. Also, while the invention has been described in connection with the high-pressure plastic injection molding of blower wheels, it is obvious that the teaching may be applied to molds for metal die casting of such wheels.

While the form of apparatus herein described constitutes a preferred embodiment of the invention, it is to be understood that the invention is not limited to this precise form of apparatus and that changes may be made therein without departing from the scope of the invention.

What is claimed is:

1. An adjustable, multiple-part mold for the injection molding of bladed blower wheels of varying blade lengths, comprising a base part defining one end surface of such blower wheel, an intermediate mold section comprising a stacked series of intermediate parts, each said intermediate part being of limited axial length and including an independent inner portion having means defining an annular series of blade-forming slots open and spaced along the periphery thereof and an independent encircling outer portion forming a cylindrical outer closure wall for said slots, means joining said intermediate parts with said blade forming slots in alignment, a mold-closing end part defining a cavity with said intermediate section for forming an end wall of such blower wheel, the number of said intermediate parts being selectable to produce blower wheels having blades of differing lengths.

2. The mold of claim 1 in which said base part includes a generally cylindrical mandrel extending coaxially of said intermediate section and terminating adjacent said end part, said intermediate section being mounted on said mandrel.

3. The mold of claim 2 in which said mandrel defines with said end part a cavity forming an axial hub of such blower wheel.

4. The mold of claim 3 comprising a pin in said mandrel at said hub cavity forming a shaft opening in the blower wheel hub.

5. A multiple-part mold for molding plastic blower wheels comprising a mandrel base part defining the axially open end of said wheel, a first intermediate part including an independent inner portion mounted on said mandrel base part and defining a plurality of peripherally open and spaced blade slots, and an independent outer annular portion forming a cylindrical closure wall to said blade slots and defining with said base part the blade reinforcing ring cavity, at least one additional said intermediate part of limited axial length having an independent inner portion mounted on said base part defining additional said peripherally open and spaced blade slots axially aligned with the slots in said first intermediate portion and further having an independent annular outer portion forming a cylindrical closure wall to said slots, a mold-closing end part defining a cavity with the adjacent said intermediate part for forming the end wall of such wheel, and means mounting said outer portions on said end part.

6. A multiple-part mold for molding plastic blower wheels comprising a base part defining the axially open end of said wheel and having a central axially extending mandrel, a first intermediate part including an independent inner portion mounted on said mandrel and defining a plurality of peripherally open and spaced blade slots, and an independent outer annular portion forming a cylindrical closure wall to said blade slots and defining with said base part the blade reinforcing ring cavity, at least one additional said intermediate part of limited axial length having an independent inner portion mounted on said mandrel defining additional said peripherally open and spaced blade slots axially aligned with the slots in said first intermediate portion and further having an independent annular outer portion forming a cylindrical closure wall to said slots, a mold-closing end part defining a cavity with said mandrel and with the adjacent said intermediate part for forming the end wall of such wheel, and means connecting said inner portions to said base part and said outer portions to said end part.

* * * * *